US 9,497,765 B2

United States Patent
Yoo et al.

(10) Patent No.: US 9,497,765 B2
(45) Date of Patent: Nov. 15, 2016

(54) NETWORK COORDINATION FOR IMPROVED INTERFERENCE CANCELLATION

(75) Inventors: Taesang Yoo, San Diego, CA (US); Hendrik Schoeneich, Heroldsberg (DE);

(Continued)

(73) Assignee: QUALCOMM INCORPORATED, San Diego, CA (US)

( * ) Notice: Subject to any disclaimer, the term of this patent is extended or adjusted under 35 U.S.C. 154(b) by 305 days.

(21) Appl. No.: 13/364,891

(22) Filed: Feb. 2, 2012

(65) Prior Publication Data

US 2013/0044697 A1    Feb. 21, 2013

Related U.S. Application Data

(60) Provisional application No. 61/524,719, filed on Aug. 17, 2011.

(51) Int. Cl.
*H04W 4/00* (2009.01)
*H04W 72/08* (2009.01)
(Continued)

(52) U.S. Cl.
CPC .......... *H04W 72/082* (2013.01); *H04L 1/0003* (2013.01); *H04L 1/0606* (2013.01)

(58) Field of Classification Search
CPC ................. H04W 28/04; H04W 72/082; H04L 1/0003
See application file for complete search history.

(56) References Cited

U.S. PATENT DOCUMENTS 7,702,023 B2 * 4/2010 Sutskover et al. ............ 375/260
7,729,316 B2 * 6/2010 Uhlik ............................ 370/334
(Continued)

FOREIGN PATENT DOCUMENTS

EP        2413513 A1    2/2012
JP     2003143654 A    5/2003
(Continued)

OTHER PUBLICATIONS

Damnjanovic et al., "A Survey on 3GPP Heterogeneous Networks", IEEE Wireless Communications, pp. 10-21 (Jun. 2011).
(Continued)

*Primary Examiner* — Gregory Sefcheck
*Assistant Examiner* — Jael Ulysse
(74) *Attorney, Agent, or Firm* — Seyfarth Shaw LLP

(57) ABSTRACT

Communications by base stations in wireless communication networks may be coordinated in a manner to improve performance by mobile devices experiencing interference from non-serving base stations. In particular, base station communications may be coordinated to improve the performance of interference cancellation by mobile devices. If a user equipment (UE) experiencing interference is capable of interference cancellation, then the base stations may coordinate to increase interference to that user equipment so as to improve that UE's ability to perform interference cancellation. Base stations may also coordinate to reduce interference for a UE, regardless of the UE's ability to perform interference cancellation. Mobile device performance improvements may also be achieved by coordinating scheduling of resources by the non-serving base stations, by using communication formats compatible with interference cancellation, by spatial coordination.

17 Claims, 10 Drawing Sheets

(75) Inventors: Myriam Rajih, Nuremberg (DE); Tao Luo, San Diego, CA (US); Siddhartha Mallik, San Diego, CA (US)

(51) Int. Cl.
*H04L 1/00* (2006.01)
*H04L 1/06* (2006.01)

(56) References Cited

U.S. PATENT DOCUMENTS

| | | | |
|---|---|---|---|
| 8,488,441 B2* | 7/2013 | Venturino et al. | 370/208 |
| 2004/0095904 A1* | 5/2004 | Laroia et al. | 370/329 |
| 2005/0130592 A1* | 6/2005 | Dowling | H04B 1/126 455/63.1 |
| 2007/0129111 A1* | 6/2007 | Kim et al. | 455/562.1 |
| 2007/0291870 A1* | 12/2007 | Ponnekanti | 375/295 |
| 2008/0117833 A1* | 5/2008 | Borran et al. | 370/252 |
| 2008/0268833 A1* | 10/2008 | Huang et al. | 455/425 |
| 2009/0041151 A1* | 2/2009 | Khan et al. | 375/267 |
| 2009/0233544 A1* | 9/2009 | Oyman et al. | 455/7 |
| 2009/0245197 A1* | 10/2009 | Ma et al. | 370/330 |
| 2009/0247181 A1* | 10/2009 | Palanki et al. | 455/452.2 |
| 2009/0264142 A1* | 10/2009 | Sankar | H04L 5/0007 455/501 |
| 2009/0316591 A1* | 12/2009 | Reial et al. | 370/252 |
| 2010/0009634 A1 | 1/2010 | Budianu et al. | |
| 2010/0009705 A1* | 1/2010 | Budianu et al. | 455/501 |
| 2010/0067450 A1* | 3/2010 | Balachandran et al. | 370/329 |
| 2010/0081448 A1* | 4/2010 | Wong et al. | 455/452.1 |
| 2010/0142466 A1* | 6/2010 | Palanki et al. | 370/329 |
| 2010/0144381 A1 | 6/2010 | Park et al. | |
| 2010/0151876 A1* | 6/2010 | Park et al. | 455/452.2 |
| 2010/0159972 A1* | 6/2010 | Cho et al. | 455/501 |
| 2010/0173612 A1* | 7/2010 | Khanfouci | H04W 16/16 455/412.1 |
| 2010/0190447 A1* | 7/2010 | Agrawal et al. | 455/63.1 |
| 2010/0227613 A1* | 9/2010 | Kim et al. | 455/434 |
| 2010/0290548 A1* | 11/2010 | Hoshino et al. | 375/260 |
| 2010/0309861 A1 | 12/2010 | Gorokhov et al. | |
| 2011/0009141 A1* | 1/2011 | Harada | H04W 16/14 455/509 |
| 2011/0075708 A1* | 3/2011 | Hahm | H04B 1/71072 375/144 |
| 2011/0116532 A1* | 5/2011 | Nentwig | 375/219 |
| 2011/0117967 A1* | 5/2011 | Vedantham | H04B 7/024 455/561 |
| 2011/0159881 A1* | 6/2011 | Shin et al. | 455/450 |
| 2011/0176497 A1* | 7/2011 | Gopalakrishnan | 370/329 |
| 2011/0194527 A1* | 8/2011 | Lin et al. | 370/330 |
| 2011/0194536 A1* | 8/2011 | Kim et al. | 370/335 |
| 2011/0201277 A1 | 8/2011 | Eguchi | |
| 2011/0201371 A1* | 8/2011 | Kwon et al. | 455/509 |
| 2011/0223867 A1* | 9/2011 | Chae et al. | 455/63.1 |
| 2012/0149362 A1* | 6/2012 | Tooher | H04W 24/10 455/423 |
| 2012/0281778 A1* | 11/2012 | Ruan et al. | 375/267 |
| 2013/0039349 A1* | 2/2013 | Ebrahimi et al. | 370/336 |
| 2013/0114562 A1* | 5/2013 | Seo et al. | 370/329 |
| 2013/0176973 A1* | 7/2013 | Gormley et al. | 370/329 |

FOREIGN PATENT DOCUMENTS

| | | |
|---|---|---|
| JP | 2009111782 A | 5/2009 |
| JP | 2010034908 A | 2/2010 |
| JP | 2010114779 A | 5/2010 |
| JP | 2010136376 A | 6/2010 |
| KR | 20100068162 A | 6/2010 |
| WO | 2009072178 A1 | 6/2009 |
| WO | 2009081514 A1 | 7/2009 |
| WO | 2010005639 | 1/2010 |
| WO | 2010109540 A1 | 9/2010 |
| WO | 2010141911 A2 | 12/2010 |

OTHER PUBLICATIONS

International Search Report and Written Opinion—PCT/US2012/051219—ISA/EPO—Dec. 19, 2012.
Qualcomm Incorporated: "Phase 2 evaluation results for HetNet CoMP scenarios", 3GPP Draft; R1-112544 Phase 2 Evaluation, 3rd Generation Partnership Project (3GPP), Mobile Competence Centre; 650, Route Des Lucioles; F-06921 Sophia-Antipolis Cedex; France, vol. RAN WG1, No. Athens, Greece; 20110822,Aug. 16, 2011, XP050537621, [Retrieved on Aug. 16, 2011].

* cited by examiner

NETWORK COORDINATION FOR IMPROVED INTERFERENCE CANCELLATION

CROSS REFERENCE TO RELATED APPLICATION

This application claims the benefit of U.S. provisional patent application No. 61/524,719 filed Aug. 17, 2011, in the names of YOO et al., the disclosure of which is expressly incorporated by reference herein in its entirety.

BACKGROUND

1. Field

Aspects of the present disclosure relate generally to wireless communication systems, and more particularly to coordinating network activity for improved interference cancellation by mobile devices.

2. Background

Wireless communication networks are widely deployed to provide various communication services such as voice, video, packet data, messaging, broadcast, etc. These wireless networks may be multiple-access networks capable of supporting multiple users by sharing the available network resources. A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Communications by base stations in wireless communication networks may be coordinated in a manner to improve performance by mobile devices experiencing interference from non-serving base stations. In particular, base station communications may be coordinated to improve the performance of interference cancellation by mobile devices. If a user equipment (UE) experiencing interference is capable of interference cancellation, then the base stations may coordinate to increase interference to that user equipment so as to improve that UE's ability to perform interference cancellation. Base stations may also coordinate to reduce interference for a UE, regardless of the UE's ability to perform interference cancellation. Mobile device performance improvements may also be achieved by coordinating scheduling of resources by the non-serving base stations, by using communication formats compatible with interference cancellation, by spatial coordination.

Offered is a method of wireless communication. The method includes determining that a victim user equipment (UE) is experiencing interference from a neighbor base station. The method also includes determining an ability of the victim user equipment to perform interference cancellation. The method further includes coordinating with a serving base station to adjust a level of interference experienced by the victim user equipment. When the victim user equipment is capable of interference cancellation, the coordinating with the serving base station includes adjusting the level of interference experienced by the victim user equipment, and/or selecting a known transmission format. When the victim user equipment is not capable of interference cancellation, the coordinating with the serving base station includes coordinating to decrease interference to the victim user equipment.

Offered is an apparatus for wireless communications. The apparatus includes means for determining that a victim user equipment (UE) is experiencing interference from a neighbor base station. The apparatus also includes means for determining an ability of the victim user equipment to perform interference cancellation. The apparatus further includes means for coordinating with a serving base station to adjust a level of interference experienced by the victim user equipment. When the victim user equipment is capable of interference cancellation, the means for coordinating with the serving base station includes means for adjusting the level of interference experienced by the victim user equipment, and/or means for selecting a known transmission format. When the victim user equipment is not capable of interference cancellation, the means for coordinating with the serving base station includes means for coordinating to decrease interference to the victim user equipment.

Offered is a computer program product for wireless communications. The computer program product includes a non-transitory computer-readable medium having program code recorded thereon. The program code includes program code to determine that a victim user equipment (UE) is experiencing interference from a neighbor base station. The program code also includes program code to determine an ability of the victim user equipment to perform interference cancellation. The program code further includes program code to coordinate with a serving base station to adjust a level of interference experienced by the victim user equipment. When the victim user equipment is capable of interference cancellation, the program code to coordinate with the serving base station includes program code to adjust the level of interference experienced by the victim user equipment, and/or program code to select a known transmission format. When the victim user equipment is not capable of interference cancellation, the program code to coordinate with the serving base station includes program code to coordinate to decrease interference to the victim user equipment.

Offered is an apparatus for wireless communications. The apparatus includes a memory and a processor(s) coupled to the memory. The processor(s) is configured to determine that a victim user equipment (UE) is experiencing interference from a neighbor base station. The processor(s) is also configured to determine an ability of the victim user equipment to perform interference cancellation. The processor(s)

is further configured to coordinate with a serving base station to adjust a level of interference experienced by the victim user equipment. When the victim user equipment is capable of interference cancellation, the at least one processor configured to coordinate with the serving base station includes at least one processor configured to adjust the level of interference experienced by the victim user equipment, and/or at least one processor configured to select a known transmission format. When the victim user equipment is not capable of interference cancellation, the at least one processor configured to coordinate with the serving base station includes at least one processor configured to coordinate to decrease interference to the victim user equipment.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA) and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
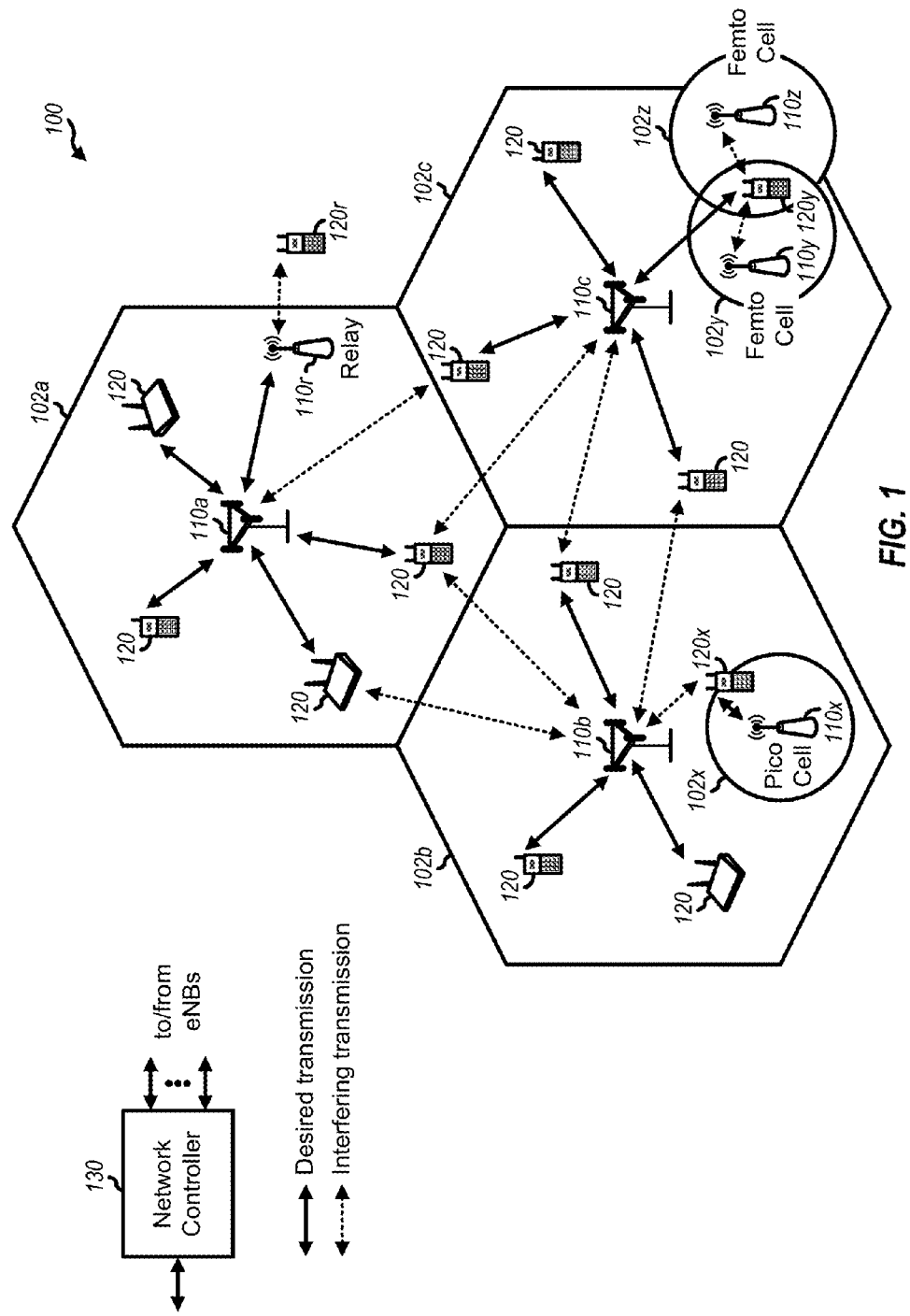
FIG. 1 is a block diagram conceptually illustrating an example of a telecommunications system.

FIG. 1 shows a wireless communication network 100, which may be an LTE-A network, in which network coordination to improve interference cancellation may be implemented. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x, which serves UE 120x, is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth.

Figure 2:
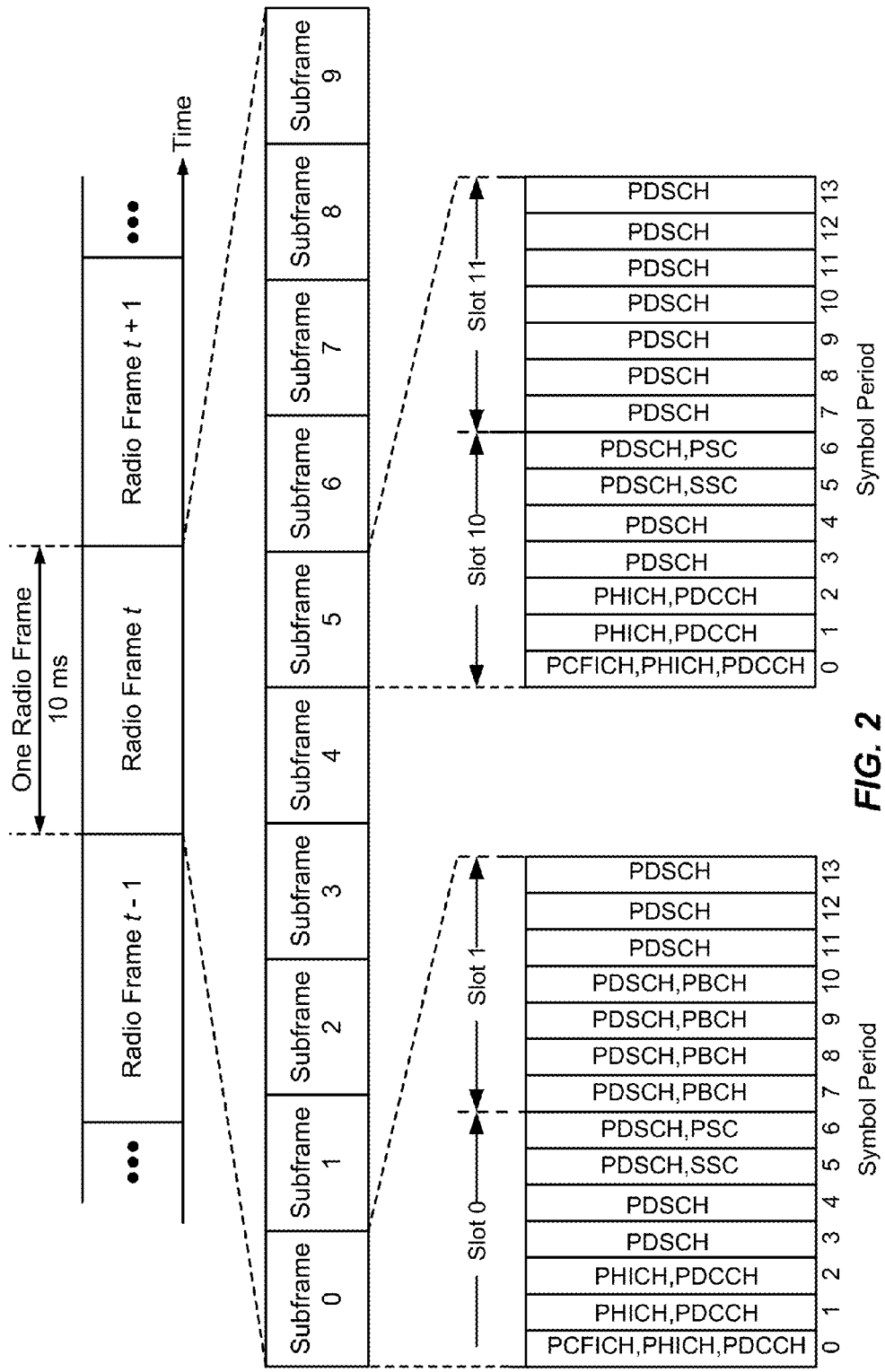
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
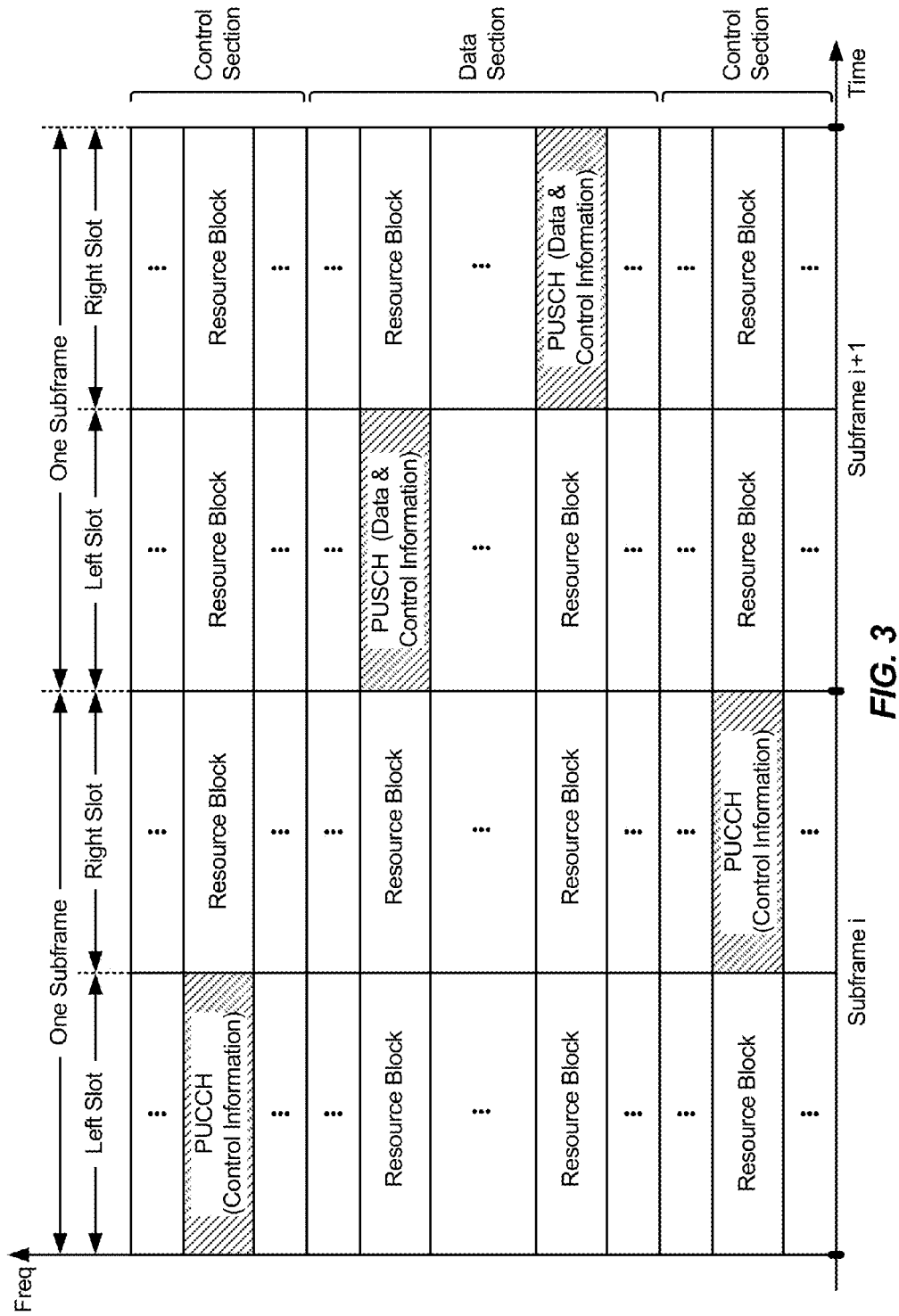
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

Figure 4:
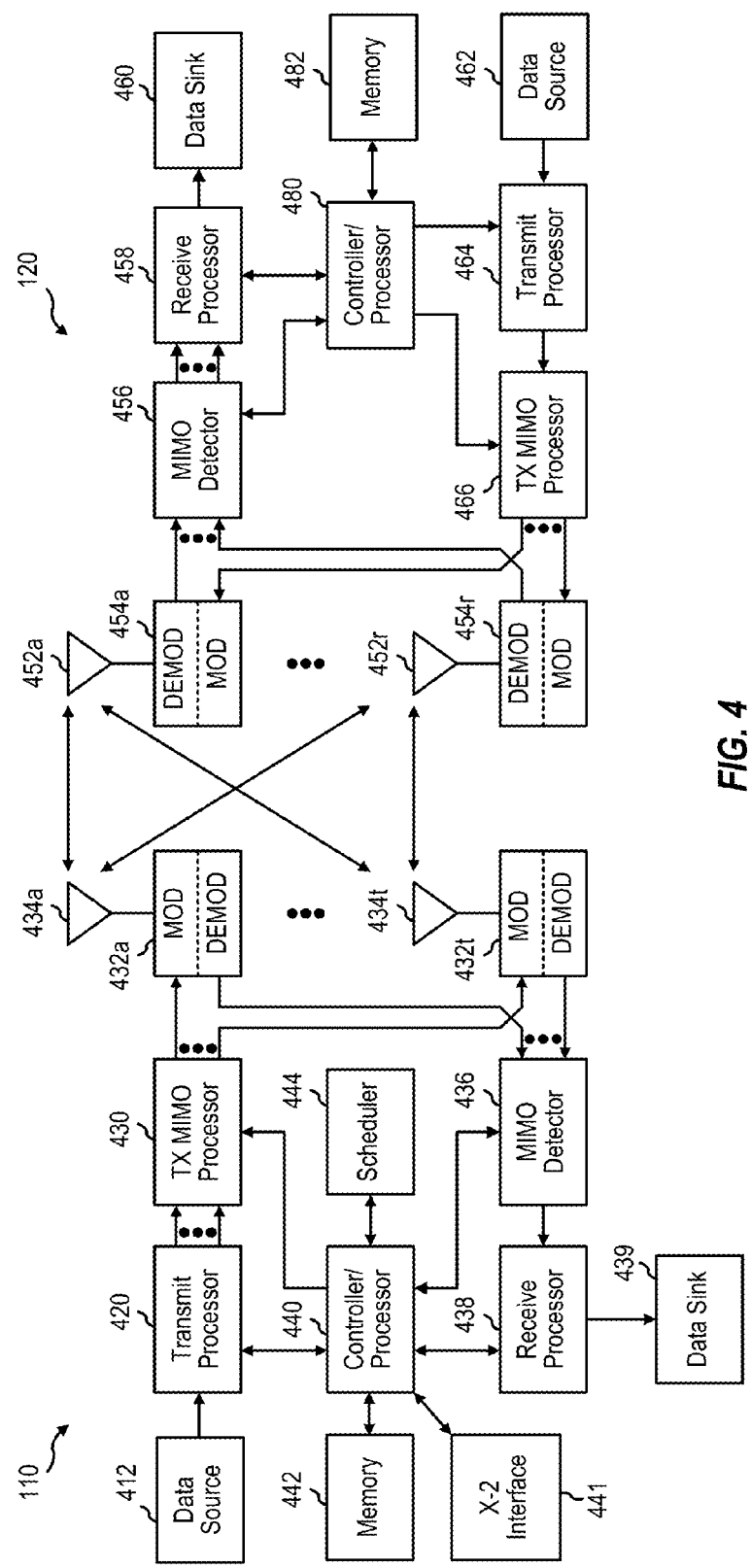
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in use method flow chart FIGS. 6-7 and/or other processes for the techniques described herein. The memories 442 and 482 may store data and program codes for the base station 110 and the UE 120, respectively. A scheduler 444 may schedule UEs for data transmission on the downlink and/or uplink.

Heterogeneous Networks

Wireless networks may have eNodeBs of different power classes. For example, three power classes may be defined, in decreasing power class, as macro eNodeBs, pico eNodeBs, and femto eNodeBs. Networks featuring such different power class eNodeBs may be referred to as heterogeneous networks. When macro eNodeBs, pico eNodeBs, and femto eNodeBs are in a co-channel deployment, the power spectral density (PSD) of the macro eNodeB (aggressor eNodeB) may be larger than the PSD of the pico eNodeB and the femto eNodeB (victim eNodeBs) creating large amounts of interference with the pico eNodeB and the femto eNodeB. Protected subframes may be used to reduce or minimize interference with the pico eNodeBs and femto eNodeBs. That is, a protected subframe may be scheduled for the victim eNodeB to correspond with a prohibited subframe on the aggressor eNodeB.

Referring back to FIG. 1, the heterogeneous wireless network 100 uses the diverse set of eNodeBs 110 (i.e., macro eNodeBs, pico eNodeBs, femto eNodeBs, and relays) to improve the spectral efficiency of the system per unit area. The macro eNodeBs 110a-c are usually carefully planned and placed by the provider of the wireless network 100. The macro eNodeBs 110a-c generally transmit at high power levels (e.g., 5 W-40 W). The pico eNodeB 110x and the relay 110r, which generally transmit at substantially lower power levels (e.g., 100 mW-2 W), may be deployed in a relatively unplanned manner to eliminate coverage holes in the coverage area provided by the macro eNodeBs 110a-c and improve capacity in the hot spots. The femto eNodeBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNodeB that may communicate with the other eNodeBs 110 of the wireless network 100 to perform resource coordination and coordination of interference management. The femto eNodeBs 110y-z typically also transmit at substantially lower power levels (e.g., 100 mW-2 W) than the macro eNodeBs 110a-c.

In operation of a heterogeneous network, such as the wireless network 100, each UE is usually served by the eNodeB 110 with the better signal quality, while the unwanted signals received from the other eNodeBs 110 are treated as interference. While such operational principals can lead to significantly sub-optimal performance, gains in network performance are realized in the wireless network 100 by using intelligent resource coordination among the eNodeBs 110, better server selection strategies, and more advanced techniques for efficient interference management.

A pico eNodeB, such as the pico eNodeB 110x, is characterized by a substantially lower transmit power when compared with a macro eNodeB, such as the macro eNodeBs 110a-c. A pico eNodeB will also usually be placed around a network, such as the wireless network 100, in an ad hoc manner. Because of this unplanned deployment, wireless networks with pico eNodeB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNodeBs 110a-c and the pico eNodeB 110x implies that, in a mixed deployment, the downlink coverage area of the pico eNodeB 110x will be much smaller than that of the macro eNodeBs 110a-c.

In the uplink case, however, the signal strength of the uplink signal is governed by the UE, and, thus, will be similar when received by any type of the eNodeBs 110. With the uplink coverage areas for the eNodeBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNodeB more difficult in the wireless network 100 than in a macro eNodeB-only homogeneous network, where the downlink and uplink handover boundaries are more closely matched.

Adaptive Resource Partitioning

For example, subframes may be allocated between three classes of subframes: protected subframes (U subframes), prohibited subframes (N subframes), and common subframes (C subframes). Protected subframes are assigned to a first eNodeB for use exclusively by the first eNodeB. Protected subframes may also be referred to as "clean" subframes based on the lack of interference from neighboring eNodeBs. Prohibited subframes are subframes assigned to a neighbor eNodeB, and the first eNodeB is prohibited from transmitting data during the prohibited subframes. For example, a prohibited subframe of the first eNodeB may correspond to a protected subframe of a second interfering eNodeB. Thus, the first eNodeB is the only eNodeB transmitting data during the first eNodeB's protected subframe. Common subframes may be used for data transmission by multiple eNodeBs. Common subframes may also be referred to as "unclean" subframes because of the possibility of interference from other eNodeBs.

At least one protected subframe is statically assigned per period. In some cases only one protected subframe is statically assigned. For example, if a period is 8 milliseconds, one protected subframe may be statically assigned to an eNodeB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Figure 5:
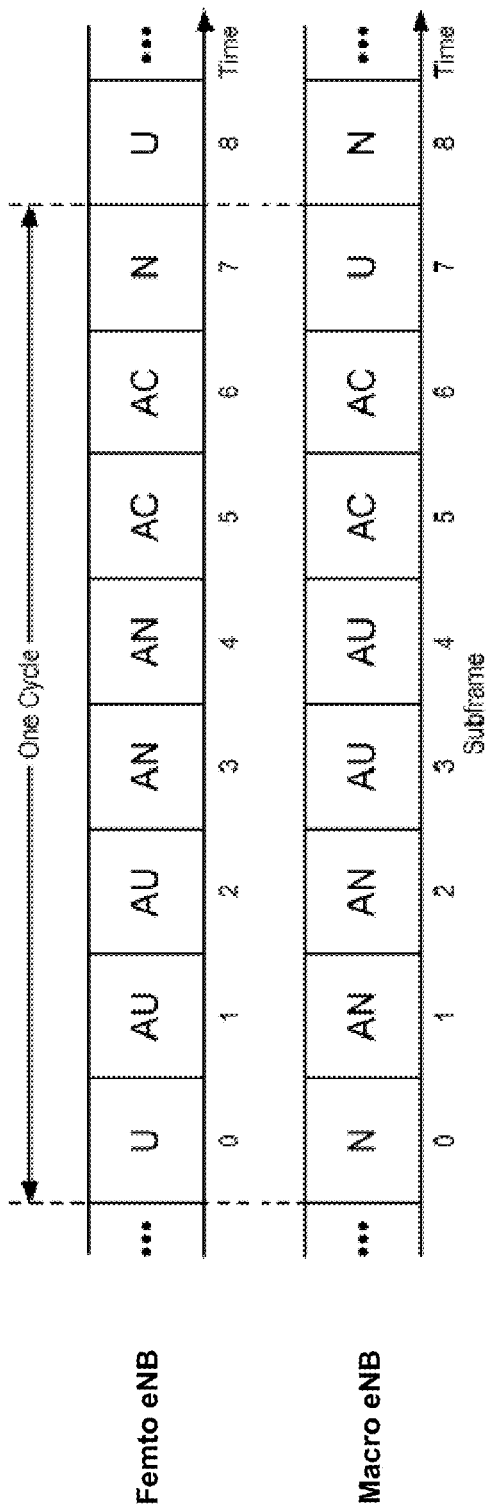
FIG. 5 is a block diagram conceptually illustrating adaptive resource partitioning in a heterogeneous network according to one aspect of the disclosure.

FIG. 5 is a block diagram illustrating TDM partitioning in a heterogeneous network according to one aspect of the disclosure. A first row of blocks illustrate sub frame assignments for a femto eNodeB, and a second row of blocks illustrate sub frame assignments for a macro eNodeB. Each of the eNodeBs has a static protected sub frame during which the other eNodeB has a static prohibited sub frame. For example, the femto eNodeB has a protected sub frame (U sub frame) in sub frame 0 corresponding to a prohibited sub frame (N sub frame) in sub frame 0. Likewise, the macro eNodeB has a protected sub frame (U sub frame) in sub frame 7 corresponding to a prohibited sub frame (N sub frame) in sub frame 7. Sub frames 1-6 are dynamically assigned as either protected sub frames (AU), prohibited sub frames (AN), and common sub frames (AC). The dynamically assigned subframes (AU/AN/AC) are referred to herein collectively as "X" subframes. During the dynamically assigned common sub frames (AC) in sub frames 5 and 6, both the femto eNodeB and the macro eNodeB may transmit data.

Protected sub frames (such as U/AU sub frames) have reduced interference and a high channel quality because aggressor eNodeBs are prohibited from transmitting. Prohibited sub frames (such as N/AN sub frames) have no data transmission to allow victim eNodeBs to transmit data with low interference levels. Common sub frames (such as C/AC sub frames) have a channel quality dependent on the number of neighbor eNodeBs transmitting data. For example, if neighbor eNodeBs are transmitting data on the common sub frames, the channel quality of the common sub frames may be lower than the protected sub frames. Channel quality on common sub frames may also be lower for extended boundary area (EBA) UEs strongly affected by aggressor eNodeBs. An EBA UE may belong to a first eNodeB but also be located in the coverage area of a second eNodeB. For example, a UE communicating with a macro eNodeB that is near the range limit of a femto eNodeB coverage is an EBA UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNodeBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities, such as, for example, the network controller 130 (FIG. 1). This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNodeBs. A dominant interference scenario may occur due to restricted association. For example, in FIG. 1, the UE 120y may be close to the femto eNodeB 110y and may have high received power for the eNodeB 110y. However, the UE 120y may not be able to access the femto eNodeB 110y due to restricted association and may then connect to the macro eNodeB 110c (as shown in FIG. 1) or to the femto eNodeB 110z also with lower received power (not shown in FIG. 1). The UE 120y may then observe high interference from the femto eNodeB 110y on the downlink and may also cause high interference to the eNodeB 110y on the uplink. Using coordinated interference management, the eNodeB 110c and the femto eNodeB 110y may communicate over the backhaul to negotiate resources. In the negotiation, the femto eNodeB 110y agrees to cease transmission on one of its channel resources, such that the UE 120y will not experience as much interference from the femto eNodeB 110y as it communicates with the eNodeB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNodeBs. The eNodeBs in a synchronous system are presumptively synchronized across the system. However, for example, considering a UE that is a distance of 5 km from the macro eNodeB, the propagation delay of any downlink signals received from that macro eNodeB would be delayed approximately 16.67 μs (5 km÷3×108, i.e., the speed of light, 'c'). Comparing that downlink signal from the macro eNodeB to the downlink signal from a much closer femto eNodeB, the timing difference could approach the level of a time tracking loop (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Network Coordinated Interference Cancellation

In cellular systems with multiple base stations (eNodeBs) and mobile terminals (UEs), the channels are typically interference limited. To reduce interference to an acceptable level, various techniques may be employed or considered. Such techniques may include coordinated multipoint (CoMP) communications where base stations cooperate in the application spatial domain, power control, interference cancellation, and resource partitioning techniques. For resource partitioning, resources may be partitioned by frequency, time, or code and the partitioning may be static or dynamic. Specific resource partitioning schemes include frequency reuse, time-domain partitioning in heterogeneous networks between macro, pico, and femto cells (either static, semi-static, or dynamic), and scheduler coordination via inter-eNodeB signaling to avoid interference.

Among the above techniques, resource partitioning and power control are intended to reduce or avoid interference. Some coordinated multipoint (CoMP) schemes such as coordinated beamforming (CBF) are also intended to reduce or avoid interference, while more sophisticated coordinated multipoint (CoMP) schemes such as joint transmission (JT) are intended to reduce or cancel the effects of interfering signals.

While resource partitioning, power control, and coordinated multipoint are interference mitigation schemes focused on eNodeB behavior, interference cancellation is an interference mitigation scheme focused on UE behavior where the UE receives the signal, degraded by interference, and actively detects and decodes the interfering signals to cancel them and isolate a desired signal.

One advantage of interference cancellation is that unlike interference avoidance schemes where the available time/frequency/spatial dimensions might be sacrificed to reduce interference, interference cancellation does not incur such loss of resources. For example, as described above in reference to adaptive resource partitioning, in time-domain resource partitioning between macro (aggressor) and pico (victim) cells, aggressors may be forced to silence themselves on certain subframes ("N" or "AN" subframes) to avoid interference to victim UEs. In this scenario, the elimination of aggressor interference toward victim UEs is achieved by sacrificing available time resources (e.g., subframe) for scheduling macro UEs. In interference cancellation based approaches, on the other hand, the aggressors can still transmit signals on those subframes, because the aggressor's interfering signals will be reduced or canceled by the victim UEs. Therefore, interference cancellation techniques can recapture lost resources (such as "N" or "AN" subframes) that may otherwise be wasted by interference avoidance schemes. Using the above techniques, time/frequency/spatial domain resources (e.g., AU/AN subframes) can be converted to common/shared use resources (e.g., C/AC subframes) available for UEs capable of performing interference cancellation or experiencing weak interference.

Two kinds of interference cancellation are codeword level interference cancellation (CWIC) and symbol level interference cancellation (SLIC). In codeword level interference cancellation, the UE decodes the interfering data from the received interfering signal and cancels that interfering data from the entire received signal. In LTE, to apply codeword level interference cancellation on a Physical Downlink Shared Channel (PDSCH), the UE must know or determine the modulation and coding format (MCS), resource allocation, spatial scheme, redundancy version, and traffic-to-pilot ratio (TPR). This essentially means that the UE needs to either decode the Physical Downlink Control Channel (PDCCH) associated with the interfering PDSCH, or obtain such information in another manner.

In symbol level interference cancellation, the UE detects the interfering modulation symbols from the received interfering signal and cancels the interfering modulation symbols from the entire received signal. In LTE, to apply symbol level interference cancellation on the PDSCH, the UE must know or determine the modulation format (but not necessarily the coding format), resource allocation, and spatial scheme, and traffic-to-pilot ratio (TPR). These can be provided by decoding the PDCCH associated with the interfering PDSCH, blindly detected, or can be obtained by the UE through another manner. Symbol level interference cancellation requires less knowledge than codeword level interference cancellation and is easier to implement, but in general, better performance is achieved using codeword level interference cancellation.

UE attempts at interference cancellation are not always successful. The success of interference cancellation depends on a number of factors including the strength of the interferers. The stronger the interference, the better the results from interference cancellation. Also, certain modulation and coding formats provide improved results with interference cancellation. For example, a quadrature phase-shifted keying (QPSK) modulated symbol is easier to detect and cancel than a 64 quadrature amplitude modulation (64-QAM) modulated symbol.

Although interference cancellation is traditionally a UE-centered solution, various aspects disclosed herein improve interference cancellation performance through coordination of signals on the network side of wireless communications (e.g., at the eNodeB). Such network coordination may improve the performance of interference cancellation at the UE, thus improving overall system performance.

In one aspect of the present disclosure, eNodeBs are coordinated to aid PDSCH interference cancellation. Coordination may be in the form of resource allocation by the scheduler, transmission format selection, spatial coordination, power control, or through other techniques. In another aspect of the present disclosure, system throughput may be improved by increasing a resource reuse factor by enabling PDSCH interference cancellation. For example, in the context of heterogeneous network resource partitioning, AU/AN subframes may be converted into AC/AC subframes. Specific methods for eNodeB coordination to aid PDSCH interference cancellation are discussed below.

Scheduling Coordination

One method of improving interference cancellation performance is through scheduling coordination on the part of eNodeBs. In this aspect, aggressor and victim eNodeBs' schedulers coordinate communications such that on resources (e.g., resource blocks/subframes) where a victim cell schedules its UEs, either: (i) the given victim cell's UE is capable of PDSCH interference cancellation and sees "strong" interference from the aggressor (i.e., interference strong enough to support successful PDSCH interference cancellation); or (ii) the given victim cell's UE sees "weak" interference from the aggressor (i.e., interference weak enough so that communication performance is sufficient without PDSCH interference cancellation). In this manner, coordinated scheduling may avoid a "moderate interference" level (i.e., an interference level that is still strong enough to disrupt the UE's performance and thus would merit avoidance/reduction/cancellation, but weak enough such that it cannot be reliably canceled by PDSCH interference cancellation). In the present disclosure, the terms "strong", "moderate", and "weak" interference are used in the manner defined above.

One example of such scheduling coordination is opportunistic scheduling of macro UEs by a macro cell on resources (e.g., resource blocks/subframes) where a macro cell's transmission would otherwise have been disallowed in the absence of PDSCH interference cancellation (i.e., N and AN subframes of the macro cell). In order to schedule macro UEs in this manner, UEs being served by a pico cell (pico UEs) in the macro coverage area would either (i) be capable of PDSCH interference cancellation and which see strong enough interference from a macro cell (macro interference) to successfully perform PDSCH interference cancellation or (ii) see weak interference from a macro cell so that communication performance is sufficient without PDSCH interference cancellation.

Another example is opportunistic scheduling of pico UEs by a pico cell on resources where the scheduling of such pico UEs would otherwise have been impossible in the absence of PDSCH interference cancellation. Without PDSCH interference cancellation, pico UEs in the cell range expansion (CRE) area cannot usually be scheduled on N, AN, and AC subframes due to strong macro interference. However, with PDSCH interference cancellation, those CRE pico UEs that are capable of PDSCH interference cancellation and see strong enough macro interference to successfully perform PDSCH interference cancellation can also be scheduled on those subframes. This may enable converting some N and AN subframes of the pico cell into C/AC subframes. On those shared subframes, a pico cell serves (i) those cell range expansion (CRE) pico UEs that see macro interference strong enough for PDSCH interference cancellation and (ii) pico UEs that see weak interference from the macro cell.

Figure 6A:
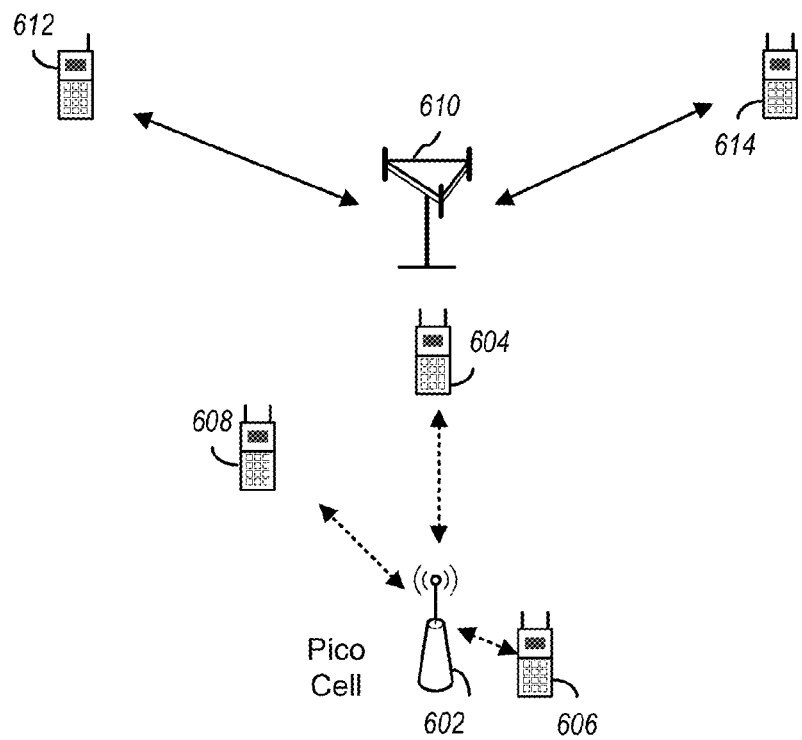
FIG. 6A is a block diagram illustrating resource allocation according to one aspect of the disclosure.

An illustration of opportunistic scheduling is shown in FIG. 6A. A pico cell 602 serves pico UEs 604, 606, and 608. A macro cell 610 serves macro UEs 612 and 614. The pico UE 1 604 is capable of PDSCH interference cancellation and would see strong macro interference from the macro cell 610, the pico UE 2 606 is capable of PDSCH interference cancellation but is closer to the pico cell and thus sees moderate macro interference, and the pico UE 3 608 would see moderate or strong macro interference but is not capable of PDSCH interference cancellation. In the case of opportunistic macro scheduling, if the pico cell 602 is serving the pico UE 1 604 on resource block 1 (subframe 1), the pico UE 2 606 on resource block 2 (subframe 2), and the pico UE 3 608 on resource block 3 (subframe 3), the macro cell 610 may serve its macro UEs 612 and 614 on resource block 1, but not on resource blocks 2 or 3. In the case of opportunistic pico scheduling, if the macro cell 610 is serving its UEs 612 and 614 on certain resource blocks (or subframes) the pico cell 602 may serve the pico UE 1 604 on the resources (subframes) of the macro cell.

The resources for use by a macro cell may be determined dynamically (on a per scheduling decision basis) or semi-statically. One way to set aside resources semi-statically, would be for each pico cell to identify from amongst the UEs that associate to it, the fraction which sees a macro cell as a strong interferer. Each pico cell then informs the macro cells of this fraction, and the macro cell decides how many resources to reserve on a semi-static basis.

Transmission Format/Scheme Coordination

Another method of improving interference cancellation performance is through transmission format/scheme coordination on the part of eNodeBs. In this aspect, an aggressor macro cell may select a known transmission format to aid PDSCH interference cancellation by a victim UE (e.g., only a specific, limited number or mutually coordinated MCSs may be used on shared resources). This coordination may reduce victim UEs attempts to obtain or blindly estimate information (such as MCS, spatial scheme, etc.) used for PDSCH interference cancellation. In this manner, a macro cell may choose a communication format (e.g., QPSK modulation or another coordinated modulation scheme) that will assist PDSCH interference cancellation by a UE. Alternatively, the macro cell may coordinate the selection of the communication format with nearby pico or femto cells. For example, in FIG. 6B, where pico UE 2 606 is capable of interference cancellation but sees moderate interference from macro cell 610, the macro cell 610 may select a QPSK modulation format for Resource 2 to assist pico UE 2 606 in performing interference cancellation.

Examples of such transmission format/scheme coordination include a macro cell always using QPSK modulation on resources where pico UEs perform PDSCH interference cancellation. For example, referring again to FIG. 6B, QPSK may also be selected as the macro's modulation format on Resource 1 because pico UE 1 604 is capable of interference cancellation. Other modulation formats, such as 64 QAM, may be selected for other resources, such as Resource 0. Resource 0 is used by the macro cell and not the pico cell, so any modulation format or spatial scheme may be used by the macro without concerns of interference to pico UEs. The pico UEs performing symbol-level PDSCH interference cancellation have a reduced uncertainty of the interfering PDSCH's modulation order without having to decode the interfering PDCCH. QPSK also generally eases interference cancellation for UEs. If resources are reserved semi-statically, a subset of these resources may be reserved for QPSK, and a complementary subset reserved for higher order modulation. For example, in reference to FIG. 6B, Resource 0 may be used for higher order modulation due no pico UEs using Resource 0 where Resources 1 and 2 are reserved for QPSK as explained above.

Figure 6B:
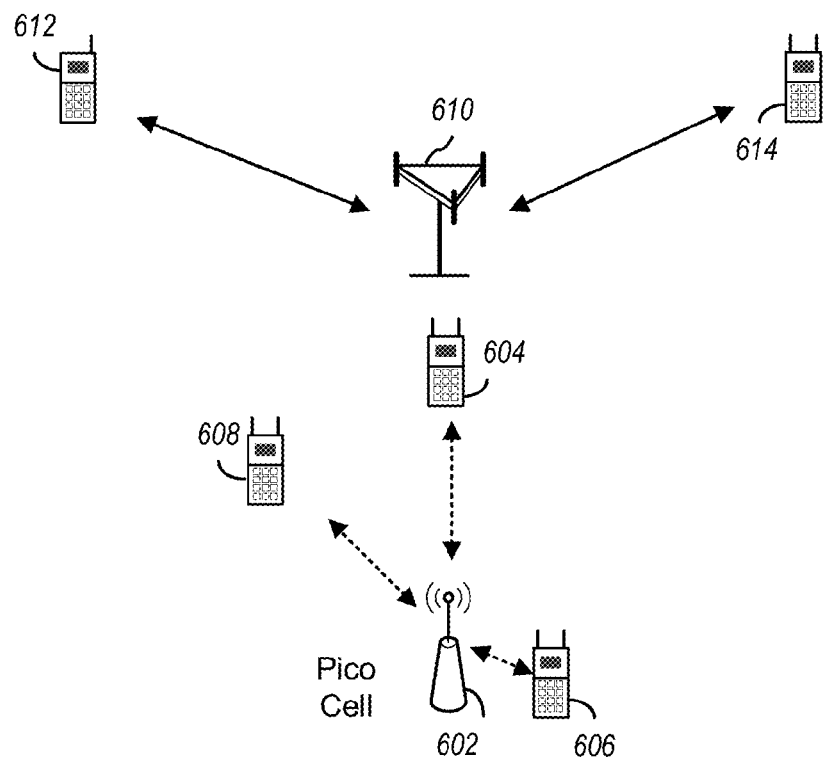
FIG. 6B is a block diagram illustrating transmission format selection according to one aspect of the disclosure.

In another example, a macro cell with multiple transmit antennas may choose a known spatial scheme, such as space-frequency block coding (SFBC), and a known rank and precoding matrix information (PMI), if applicable, on resources where pico UEs perform PDSCH interference cancellation. Thus, the pico UEs performing symbol-level PDSCH interference cancellation have a reduced uncertainty on the interfering PDSCH's spatial scheme without having to decode the interfering PDCCH. For example, as shown in FIG. 6B, SFBC may be chosen as the spatial scheme by the macro for Resources 1 and 2 because pico UE 1 604 and pico UE 2 606 are capable of performing interference cancellation.

In another example, a macro cell may choose a certain modulation and coding format (MCS), e.g. MCS 0, on resources where pico UEs perform PDSCH interference cancellation. Thus, the pico UEs performing codeword-level PDSCH interference cancellation have a reduced uncertainty on the interfering PDSCH's modulation format without having to decode the interfering PDCCH. The use of MCS 0 also improves codeword-level PDSCH interference cancellation performance.

In another example, a macro cell may use a known traffic-to-pilot ratio (TPR) on resources where pico UEs perform PDSCH interference cancellation. Thus, the pico UEs performing symbol-level or codeword-level PDSCH interference cancellation have a reduced uncertainty on the interfering PDSCH's transmit power level.

Spatial Coordination

Another method of improving interference cancellation performance is through spatial coordination in a coordinated multipoint (CoMP) system. In this aspect, an aggressor macro cell may coordinate/adjust its CoMP scheme and/or beam direction to aid PDSCH interference cancellation by victim UEs.

In one configuration, the macro cell forms beams such that interference caused to CRE pico UEs is either avoided or strengthened. For example, with X pico UEs in a given macro cell, the macro eNodeB could use coordinated beamforming such that the interference to one of the cell range expansion (CRE) pico UEs (which should be capable of PDSCH interference cancellation) is boosted to a "strong" level. The interference to the remaining X-1 cell range expansion (CRE) pico UEs (which may or may not be capable of PDSCH interference cancellation) are suppressed to a "weak" level.

Power Control

Another method of improving interference cancellation performance is through power control adjustments by eNodeBs. In this aspect, an aggressor macro cell may adjust its transmit power over its time/frequency resources to aid PDSCH interference cancellation by victim UEs. That is, the macro can boost its transmit power on resources where pico UEs perform PDSCH interference cancellation, while the macro can reduce its transmit power (or silence itself) elsewhere. For example, referring to the scenario of FIG. 6A, where pico UE 2 606 is capable of interference cancellation but sees moderate interference from macro cell 610, the macro cell 610 may boost its transmit power on Resource 2 (which is used by pico UE 2 606 to communicate with pico cell 602) thereby increasing interference to pico UE 2 606 and improving its ability to perform interference cancellation. In another example, referring again to the scenario of FIG. 6A, the macro cell 610 may reduce its transmit power on Resource 2 to reduce interference to pico UE 2 606. Such power control methods may also be applied during uplink communications.

Network coordination by eNodeBs may be over any link connecting eNodeBs such as X2, fiber, etc. Although the examples above may use the example of an LTE network, the methods above are not limited to LTE systems and may be used with other communication networks. Also, although the examples above may be given for PDSCH interference cancellation, the methods above may be applicable for other forms of interference cancellation (e.g., PDCCH interference cancellation, etc.). Further, although examples above may be under time-domain resource partitioning, the methods above are applicable to more general scenarios. Similarly, although a macro/pico network is described to illustrate the examples above, the methods are applicable to other network configurations as well (such as femto cells, remote radio heads (RRHs), etc.)

Figure 7:
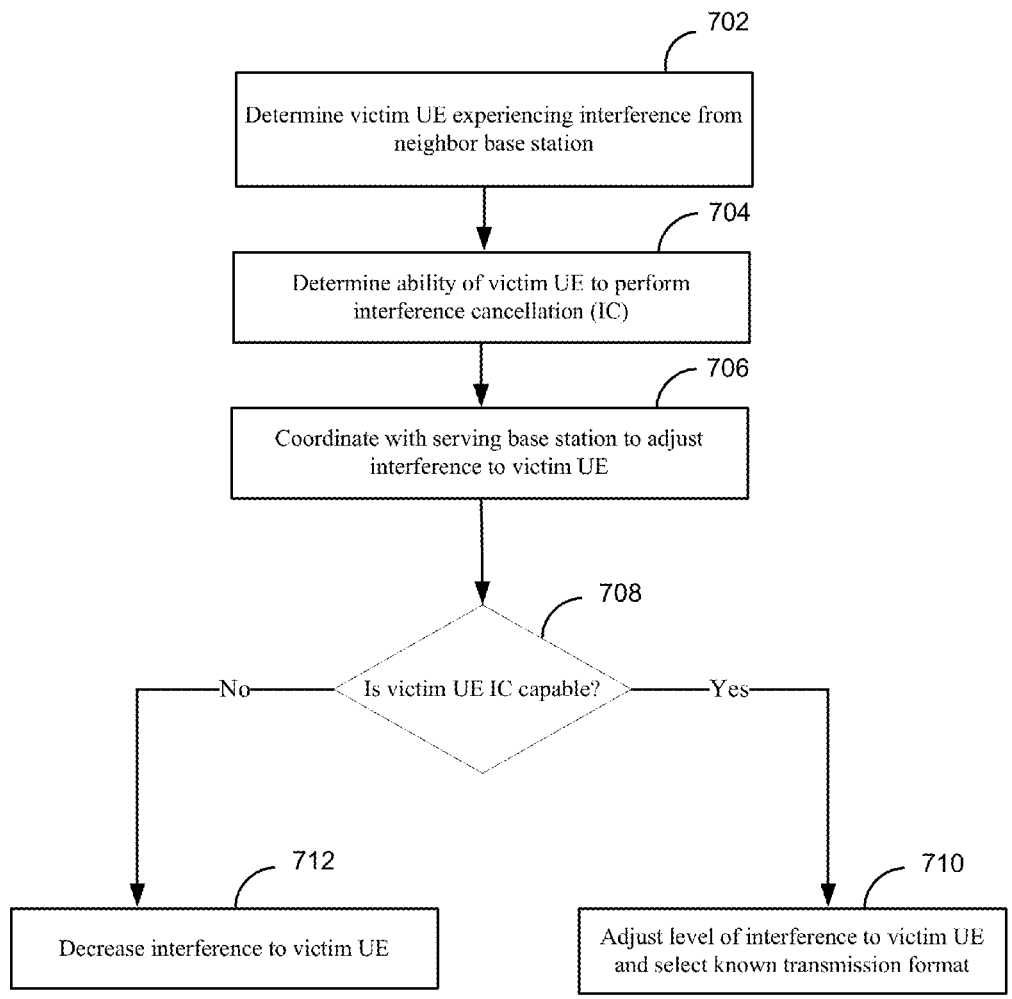
FIG. 7 is a block diagram illustrating a method for network coordination to improve interference cancellation according to one aspect of the present disclosure.

FIG. 7 illustrates a method whereby an eNodeB may coordinate with another eNodeB to adjust interference for one or more victim UEs.

At block 702, it is determined that a victim UE is experiencing interference from a neighbor base station. The determining may be performed by a neighbor base station or by a serving base station. The victim UE may send an indication to its serving base station of the experienced interference. The serving base station may then send the indication to the neighbor base station through a backhaul communication channel, such as an X-2 interface 441 shown in FIG. 4, or through other channels.

At block 704 of FIG. 7, the ability of the victim UE to perform interference cancellation (IC) is determined. The determining may be performed by a neighbor base station or by a serving base station. The indication from the victim UE to the serving base station may include information regarding the ability of the victim UE to perform interference cancellation. The information may include whether the victim UE can perform interference cancellation at all, as well as detailed information regarding how effective the UE's interference cancellation efforts are under certain communication circumstances and/or for certain communication resources.

At block 706, a neighbor base station and serving base station may coordinate to adjust the interference to the victim UE. As with communication of the indication of interference, the neighbor base station and serving base station may coordinate the interference adjustment over a backhaul communication channel, such as an X-2 interface 441 shown in FIG. 4, or through other channels.

If the UE is not capable of performing interference cancellation (as determined in block 708 of FIG. 7), then the neighbor base station and serving base station coordinate to decrease interference to the victim UE as shown in block 712. The interference may be decreased as described above. For example, decreasing interference to the victim UE may include reallocating communication resources between the neighbor base station and serving base station to avoid both base stations using resources in a manner which causes interference to the victim UE. Decreasing interference may also include beamforming by the neighbor base station away from the victim UE to reduce the interference. Decreasing interference may also include adjusting a power level of neighboring downlink communications to reduce the interference. Decreasing interference may also include directing victim UE communications to resource blocks that are less likely to suffer from interference. Other techniques for decreasing interference may also be used. The interference may be decreased dynamically or semi-statically.

If the UE is capable of performing interference cancellation (as determined in block 708 of FIG. 7), then the neighbor base station and serving base station coordinate to adjust the interference to the victim UE and may select a known transmission format, as shown in block 710. The interference to the victim UE may be adjusted to decrease the interference, or to increase the interference in a manner which improves the ability of the victim UE to perform interference cancellation. The interference may be adjusted dynamically or semi-statically. Interference may be adjusted in the manners described above. For example, interference adjustment may include reallocating communication resources between the neighbor base station and serving base station to either increase or decrease interference to the victim UE. Coordinated beamforming may increase or decrease interference to the victim UE. A power level of downlink communications may be adjusted to increase or decrease interference to the victim UE. Adjusting the interference may also include directing victim UE communications to resource blocks that are more or less likely to suffer from interference.

The known transmission format may be selected as described above. The known transmission format may be selected to assist interference cancellation by the victim UE. The known transmission format may be selected based on a traffic-to-pilot ratio of the victim UE. The known transmission format may be a known spatial scheme, such as space-frequency block coding (SFBC) and/or a known rank and precoding matrix information (PMI). The known transmission format may be a known modulation order, such as QPSK.

Figure 8:
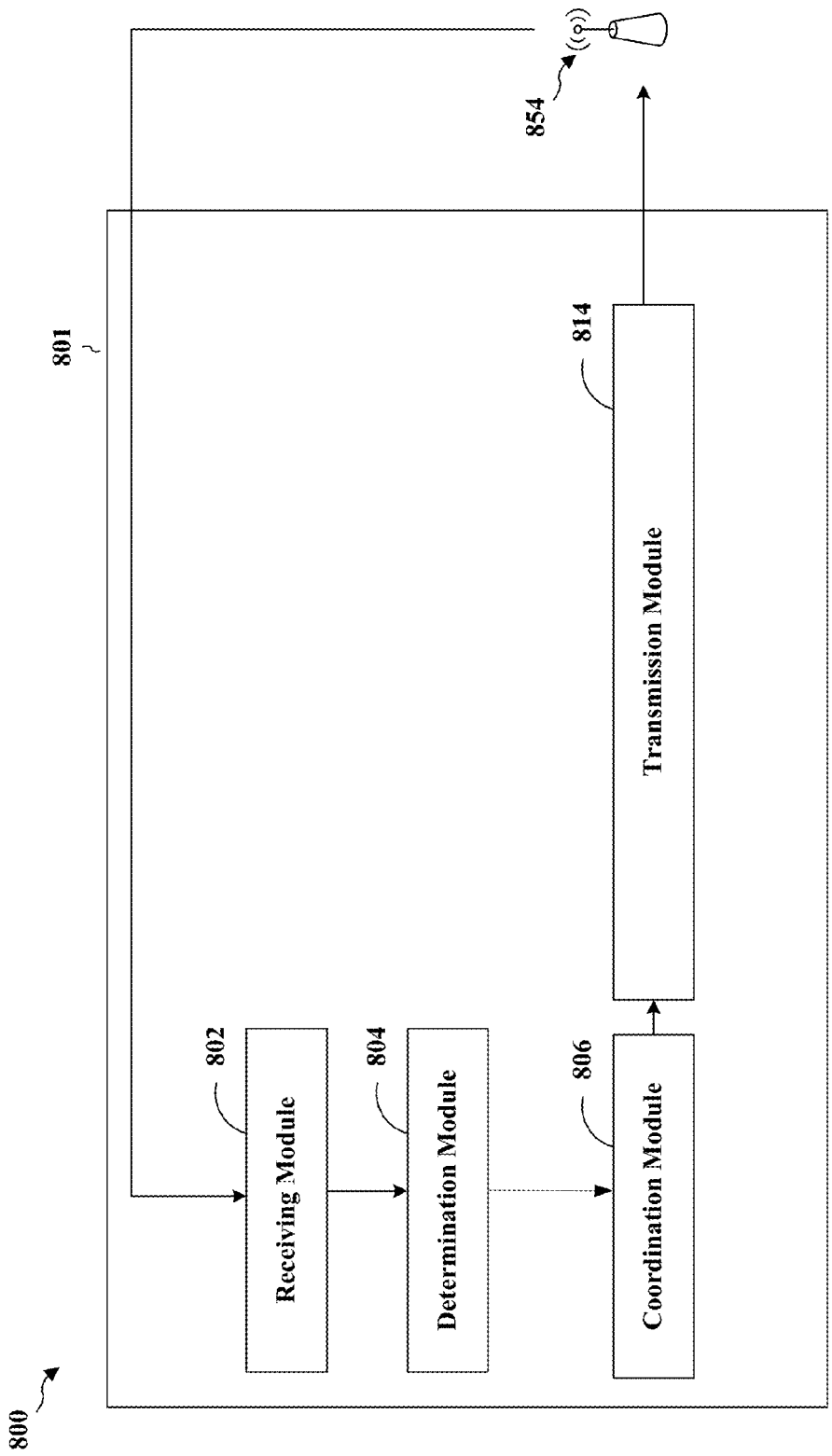
FIG. 8 is a conceptual data flow diagram illustrating the data flow between different modules/means/components in an exemplary apparatus according to one aspect of the present disclosure.

FIG. 8 is a conceptual data flow diagram 800 illustrating the data flow between different modules/means/components in an exemplary apparatus 801. The apparatus 801 includes a module 802 that receives communications from an antenna (or other external communication device) 854. The communication may include a message from a UE or eNodeB. The message may include an indicator, which may be a table entry, bit flag, data structure, or other indicator, which indicates an ability of a UE experience interference to perform interference cancellation. The indicator is passed from the receiving module 802 to the determining module 804. The determining module 804 reads the indicator to determine whether the victim UE is experiencing interference and whether the UE is capable of interference cancellation. The determining module 804 then passes data to the coordinating module 806 which includes data fields identifying the victim UE and its ability to perform interference cancellation. The determining module 804 may also pass data to the coordinating module 806 that identifies the victim UE's serving base station, the neighbor base station causing interference to the victim UE, and/or designated actions to adjust the level of interference experienced by the user. The coordinating module 806 then passes data including the adjustment scheme, the neighbor base station, etc. to the transmission module 814 for transmission to the appropriate UE(s) and/or base station(s) through the communication device 854.

Figure 9:
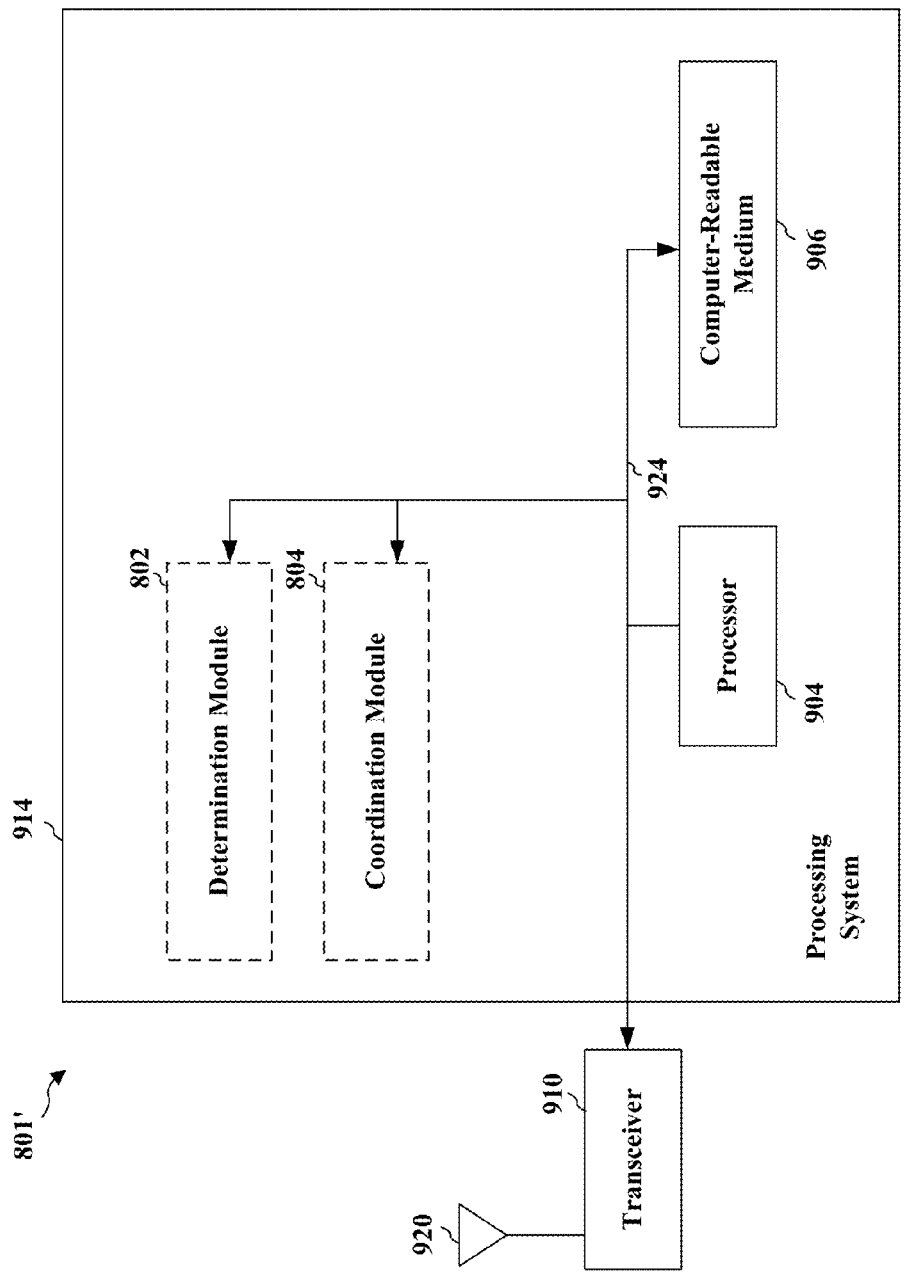
FIG. 9 is a diagram illustrating an example of a hardware implementation for an apparatus employing a processing system according to one aspect of the present disclosure.

The apparatus 801 may include additional modules that perform each of the blocks of the process in the aforementioned flow chart in FIG. 7. As such, each block in the aforementioned flow chart in FIG. 7 may be performed by a module and the apparatus may include one or more of those modules. The modules may be one or more hardware components specifically configured to carry out the stated processes, implemented by a processor configured to perform the stated processes, stored within a computer-readable medium for implementation by a processor, or some combination thereof FIG. 9 is a diagram illustrating an example of a hardware implementation for an apparatus 801' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 904, the modules 802 and 804, and the computer-readable medium 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The processing system 914 includes a processor 904 coupled to a computer-readable medium 906. The processor 904 is responsible for general processing, including the execution of software stored on the computer-readable medium 906. The software, when executed by the processor 904, causes the processing system 914 to perform the various functions described supra for any particular apparatus. The computer-readable medium 906 may also be used for storing data that is manipulated by the processor 904 when executing software. The processing system further includes at least one of the modules 802 and 804. The modules may be software modules running in the processor 904, resident/stored in the computer readable medium 906, one or more hardware modules coupled to the processor 904, or some combination thereof The processing system 914 may be a component of the eNodeB 110 and may include the memory 442 and/or at least one of the transmit processor 420, the receive processor 438, and the controller/processor 440.

In one configuration, the apparatus 102/801' for wireless communication includes means for determining and means for coordinating. The aforementioned means may be one or more of the aforementioned modules of the apparatus 801 and/or the processing system 914 of the apparatus 801' configured to perform the functions recited by the aforementioned means. As described above, the processing system 914 may include the memory 442 and/or at least one of the transmit processor 420, the receive processor 438, the antennae 434, the scheduler 444, the X-2 interface 441, and the controller/processor 440. In another aspect, the aforementioned means may be any module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining that a victim user equipment (UE) is experiencing moderate interference from a neighbor base station;
   determining whether the victim UE is capable of performing interference cancellation; and
   coordinating with a serving base station to adjust a level of interference experienced by the victim UE in response to the level of interference being:
   greater than a first threshold such that the level of interference disrupts performance of the victim UE, and
   less than a second threshold such that the level of interference cannot be reliably canceled with interference cancellation, wherein when the victim UE is capable of performing the interference cancellation, the level of interference is adjusted by scheduling the victim UE to communicate on at least one resource block with a greater level of interference in comparison to other resource blocks such that the level of interference is increased, an ability of the victim UE to perform interference cancellation being increased based on the increase in the level of interference, and wherein when the victim UE is not capable of performing the interference cancellation, the level of interference is adjusted by decreasing the level of interference.

2. The method of claim 1, in which adjusting the level of interference further comprises reallocating resources between the neighbor base station and the serving base station.

3. The method of claim 1 in which adjusting the level of interference further comprises coordinating beamforming to improve the ability of the victim UE to cancel the interference.

4. The method of claim 1 in which decreasing the level of interference comprises beamforming away from the victim UE when the victim UE is not capable of performing the interference cancellation.

5. The method of claim 1 in which adjusting the level of interference further comprises adjusting a power level of downlink communications to improve the ability of the victim UE to cancel the interference.

6. The method of claim 5 in which adjusting the power level of downlink communications comprises increasing the level of interference.

7. The method of claim 1 in which the coordinating with the serving base station occurs dynamically or semi-statically.

8. The method of claim 1 in which a transmission format of the interference is selected to improve the ability of the victim UE to perform interference cancellation.

9. An apparatus for wireless communications, comprising:
   means for determining that a victim user equipment (UE) is experiencing moderate interference from a neighbor base station;
   means for determining whether the victim UE is capable of performing interference cancellation; and
   means for coordinating with a serving base station to adjust a level of interference experienced by the victim UE in response to the level of interference being:
      greater than a first threshold such that the level of interference disrupts performance of the victim UE, and
      less than a second threshold such that the level of interference cannot be reliably canceled with interference cancellation,
   wherein when the victim UE is capable of performing the interference cancellation, the level of interference is adjusted by scheduling the victim UE to communicate on at least one resource block with a greater level of interference in comparison to other resource blocks such that the level of interference is increased, an ability of the victim UE to perform interference cancellation being increased based on the increase in the level of interference, and
   wherein when the victim UE is not capable of performing the interference cancellation, the level of interference is adjusted by decreasing the level of interference.

10. A non-transitory computer-readable medium having program code recorded thereon for wireless communications, the program code comprising:
   program code to determine that a victim user equipment (UE) is experiencing moderate interference from a neighbor base station;
   program code to determine whether the victim UE is capable of performing interference cancellation; and
   program code to coordinate with a serving base station to adjust a level of interference experienced by the victim UE in response to the level of interference being:
      greater than a first threshold such that the level of interference disrupts performance of the victim UE, and
      less than a second threshold such that the level of interference cannot be reliably canceled with interference cancellation,
   wherein when the victim UE is capable of performing the interference cancellation, the level of interference is adjusted by scheduling the victim UE to communicate on at least one resource block with a greater level of interference in comparison to other resource blocks such that the level of interference is increased, an ability of the victim UE to perform interference cancellation being increased based on the increase in the level of interference, and
   wherein when the victim UE is not capable of performing the interference cancellation, the level of interference is adjusted by decreasing the level of interference.

11. An apparatus for wireless communications, comprising:
   a memory; and
   at least one processor coupled to the memory, the at least one processor being configured:
      to determine that a victim user equipment (UE) is experiencing moderate interference from a neighbor base station;
      to determine whether the victim UE is capable of performing interference cancellation; and
      to coordinate with a serving base station to adjust a level of interference experienced by the victim UE in response to the level of interference being:
         greater than a first threshold such that the level of interference disrupts performance of the victim UE, and
         less than a second threshold such that the level of interference cannot be reliably canceled with interference cancellation,
      wherein when the victim UE is capable of performing the interference cancellation, the level of interference is adjusted by scheduling the victim UE to communicate on at least one resource block with a greater level of interference in comparison to other resource blocks such that the level of interference is increased, an ability of the victim UE to perform interference cancellation being increased based on the increase in the level of interference, and
      wherein when the victim UE is not capable of performing the interference cancellation, the level of interference is adjusted by decreasing the level of interference.

12. The apparatus of claim 11, in which the at least one processor is further configured to adjust the level of interference by reallocating resources between the neighbor base station and the serving base station.

13. The apparatus of claim 11 in which the at least one processor is further configured to adjust the level of interference by beamforming to improve the ability of the victim UE to cancel the interference.

14. The apparatus of claim 11 in which the at least one processor is configured to beamform away from the victim UE when the victim UE is not capable of performing the interference cancellation.

15. The apparatus of claim 11 in which the at least one processor is further configured to adjust the level of interference by adjusting a power level of downlink communications to improve the ability of the victim UE to cancel the interference.

16. The apparatus of claim 15 in which the at least one processor is further configured to adjust the power level of downlink communications by increasing the level of interference.

17. The apparatus of claim 11 in which the at least one processor is further configured to coordinate with the serving base station dynamically or semi-statically.

\* \* \* \* \*